(12) United States Patent
Hadano et al.

(10) Patent No.: US 11,900,425 B2
(45) Date of Patent: Feb. 13, 2024

(54) INFORMATION PROVIDING DEVICE, INFORMATION PROVIDING METHOD, AND NON-TRANSITORY STORAGE MEDIUM

(71) Applicant: TOYOTA JIDOSHA KABUSHIKI KAISHA, Toyota (JP)

(72) Inventors: Hiroyasu Hadano, Toyota (JP); Yusuke Kaneko, Toyota (JP); Jun Goto, Toyota (JP); Hiroko Tsujimura, Gifu (JP); Miho Otsuka, Nagoya (JP); Hideo Hasegawa, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 624 days.

(21) Appl. No.: 16/575,708

(22) Filed: Sep. 19, 2019

(65) Prior Publication Data

US 2020/0090235 A1   Mar. 19, 2020

(30) Foreign Application Priority Data

Sep. 19, 2018  (JP) .................................. 2018-174934

(51) Int. Cl.
*G06Q 30/02* (2023.01)
*G06Q 30/0283* (2023.01)
(Continued)

(52) U.S. Cl.
CPC ..... *G06Q 30/0283* (2013.01); *G06Q 30/0251* (2013.01); *H04W 4/40* (2018.02)

(58) Field of Classification Search
CPC .......... G06Q 30/0283; G06Q 30/0284; G06Q 30/0206; G06Q 30/0605; G07B 13/04
(Continued)

(56) References Cited

U.S. PATENT DOCUMENTS 7,080,030 B2 * 7/2006 Eglen ..................... G06Q 10/00
  705/26.8
11,451,384 B2 * 9/2022 Darnell ............... H04W 12/084
(Continued)

FOREIGN PATENT DOCUMENTS

JP        2002-063482 A       2/2002
JP        2003-006295 A       1/2003
(Continued)

OTHER PUBLICATIONS

"Moy Concept", Apr. 15, 2009, carbodydesign.com, 5 pages (Year: 2009).*

(Continued)

*Primary Examiner* — Shannon S Campbell
*Assistant Examiner* — Freda A Nelson
(74) *Attorney, Agent, or Firm* — Oliff PLC (57) ABSTRACT

In an information providing device for providing information about a moving object which is used by a user by making an application for use thereof, the device includes a controller comprising at least one processor configured to execute: receiving a start and an end of the use of the moving object by the user through communication with a user device which is correlated with the user; and displaying information indicating that the moving object is available on a display unit which is provided by the moving object and which can be visually recognized from the outside of the moving object, in cases where the moving object is not being used.

7 Claims, 5 Drawing Sheets

(51) Int. Cl.
*G06Q 30/0251* (2023.01)
*H04W 4/40* (2018.01)

(58) Field of Classification Search
USPC .............................. 705/5, 400, 417, 14.62
See application file for complete search history.

(56) References Cited

U.S. PATENT DOCUMENTS

| | | | |
|---|---|---|---|
| 2002/0022979 | A1 | 2/2002 | Whipp et al. |
| 2002/0186144 | A1* | 12/2002 | Meunier ................ G07B 15/00 340/901 |
| 2005/0012589 | A1 | 1/2005 | Kokubu et al. |
| 2013/0238167 | A1* | 9/2013 | Stanfield ................ G08G 1/095 701/2 |
| 2013/0268406 | A1* | 10/2013 | Radhakrishnan .. G06Q 30/0284 705/26.61 |
| 2014/0074757 | A1* | 3/2014 | De Gennaro .......... G07B 13/04 705/417 |
| 2015/0348112 | A1* | 12/2015 | Ramanujam ....... G06Q 30/0266 705/14.63 |
| 2016/0363991 | A1* | 12/2016 | Schlecht ................ B60K 35/00 |
| 2018/0129981 | A1* | 5/2018 | Fujimoto .............. G06V 40/10 |
| 2018/0357668 | A1* | 12/2018 | Kanemoto ......... G06Q 30/0259 |
| 2019/0057480 | A1* | 2/2019 | Zhang ................. G06Q 30/0206 |
| 2019/0318625 | A1 | 10/2019 | Morimura |
| 2020/0005353 | A1* | 1/2020 | Shibayama ........ G06Q 30/0242 |
| 2020/0021435 | A1* | 1/2020 | Darnell ................ H04L 9/0866 |
| 2020/0104881 | A1* | 4/2020 | Yasui ..................... G06Q 50/30 |

FOREIGN PATENT DOCUMENTS

| | | |
|---|---|---|
| JP | 2003-044979 A | 2/2003 |
| JP | 2011-86282 A | 4/2011 |
| JP | 2013-054537 A | 3/2013 |
| JP | 2016-095750 A | 5/2016 |
| JP | 2017-076262 A | 4/2017 |
| JP | 2018-081617 A | 5/2018 |
| JP | 2018-116703 A | 7/2018 |
| WO | WO-2013072729 A1 * | 5/2013 ........... G06Q 10/047 |

OTHER PUBLICATIONS

Greg Kumparak, "Grabb-It wants to turn your car's window into a trippy video billboard", 2:52 PM EDT• Aug. 15, 2018, techcrunch.com, (Year: 2018).*

Lopez, Jonathan, "2014 Toyota FV2", Jan. 30, 2015; topspeed.com, 2 pages (Year: 2015).*

Morath, Adam, "Toyota Fun-Vii Concept Offers Impossible Level Of Vehicle Personalization", Nov. 28, 2011, autoblog.com, 6 pages (Year: 2011).*

* cited by examiner

INFORMATION PROVIDING DEVICE, INFORMATION PROVIDING METHOD, AND NON-TRANSITORY STORAGE MEDIUM

CROSS REFERENCE TO THE RELATED APPLICATION

This application claims the benefit of Japanese Patent Application No. 2018-174934, filed on Sep. 19, 2018, which is hereby incorporated by reference herein in its entirety.

BACKGROUND

Technical Field

The present disclosure relates to a technique of providing information on a moving object (a shared car, etc.) which is used by a user by making an application for use thereof.

Description of the Related Art

Patent literature 1 discloses that advertisement data is transmitted to a vehicle through FM multiplex broadcasting, and that the vehicle displays the advertisement data on an advertising display device arranged inside the vehicle, thereby advertising to people outside the vehicle. The content of an advertisement assumed in the patent literature 1 is related to stores such as restaurants, supermarkets, etc., but advertising the use of the vehicle is not assumed.

CITATION LIST

Patent Literature

Patent Literature 1: Japanese patent application laid-open publication No. 2002-63482

SUMMARY

The present disclosure has for its object to provide information so as to be able to effectively promote the use of a moving object (e.g., a shared car) which a user uses by making an application for use thereof.

A first aspect of the present disclosure may reside in an information providing device for providing information about a moving object which is used by a user by making an application for use thereof, the device including a controller comprising at least one processor configured to execute: receiving a start and an end of the use of the moving object by the user through communication with a user device which is correlated with the user; and displaying information indicating that the moving object is available on a display unit which is provided by the moving object and which can be visually recognized from the outside of the moving object, in cases where the moving object is not being used.

A second aspect of the present disclosure may reside in an information providing method for providing information about a moving object which is used by a user by making an application for use thereof, the method comprising: receiving a start and an end of the use of the moving object by the user through communication with a user device which is correlated with the user; and displaying information indicating that the moving object is available on a display unit which is provided by the moving object and which can be visually recognized from the outside of the moving object, in cases where the moving object is not being used.

A third aspect of the present disclosure may reside in a non-transitory storage medium which stores a program for causing a computer to execute an information providing method for providing information about a moving object which is used by a user by making an application for use thereof, the program being configured to cause the computer to execute: receiving a start and an end of the use of the moving object by the user through communication with a user device which is correlated with the user; and displaying information indicating that the moving object is available on a display unit which is provided by the moving object and which can be visually recognized from the outside of the moving object, in cases where the moving object is not being used.

According to the present disclosure, it is possible to provide information so as to be able to effectively promote the use of a moving object which a user uses by making an application for use thereof.

DESCRIPTION OF THE EMBODIMENTS

A one-way car sharing service is spreading in recent years. Here, the one-way car sharing service is a car sharing service in which a place where to return a shared car is not limited to a specific place (a station, a parking frame (space), etc.), but a user can stop the shared car at an arbitrary place within a service area, thereby making it possible to end the use of the car. In such a one-way car sharing service, it is assumed that a user searches for a stopping or parking location of an available vehicle by using a smart phone, etc., or discovers a shared car visually.

Here, there is also a demand for making the external appearances of shared cars similar to those of normal or ordinary vehicles as much as possible. In that case, there arises a problem that a user can not easily determines visually whether a vehicle stopping or parking on a road is a shared car. Here, it can be determined by using an application (hereinafter, referred to as an app) on a smart phone whether a vehicle stopping or parking on a road is a shared car, but in this case, the app must be activated, which takes time and effort for the user.

In view of the above, in this embodiment, the use of a moving object is promoted by effectively providing information about the moving object which a user uses by making an application for use thereof.

In cases where the moving object is not being used, an information providing device according to this embodiment may display information indicating that the moving object is available on a display unit possessed by the moving object. With this, the user becomes able to easily grasp that the moving object being parked on the road is available.

More specifically, this embodiment may reside in an information providing device for providing information about a moving object which is used by a user by making an application for use thereof, the device including a controller comprising at least one processor configured to execute: receiving a start and an end of the use of the moving object by the user through communication with a user device which is correlated with the user; and displaying information indicating that the moving object is available on a display unit which is provided by the moving object and which can be visually recognized from the outside of the moving object, in cases where the moving object is not being used. The term or expression "the moving object is being used" may mean a situation in which the moving object can not be used by any person other than the user who is using the same. In addition, the guidance "the information indicating that the moving object is available" may be any kind of information as long as a user looking at this guidance is able to grasp that the moving object is available. The guidance may also explicitly include the word "available", for example, or may not include it. For example, only by displaying guidance information including a service name or a logo, the user looking at the guidance information can grasp that the moving object is available, so a guidance including only a service name or a logo also corresponds to "the information indicating that the moving object is available".

According to this embodiment, in a moving object which a plurality of users use by making an application for use as in a shared car, information can be provided only in cases where the moving object is available to a user, whereas information can not be provided during the use of the moving object. Accordingly, it is possible to satisfy both a demand for making the external appearance of a moving object during use thereof similar to that of an ordinary vehicle, and a demand for enabling the user to easily distinguish an available moving object.

In this embodiment, the display unit may be arranged in the interior of the moving object, or may be arranged in the exterior of the moving object, as long as it can be visually recognized from the outside of the moving object. The user device may be a portable computer with a communication function such as a smart phone, or may be a non-contact or contactless IC card. The moving object may be an arbitrary device that can move or transport the user, and it includes a vehicle (including a two-wheeled vehicle), a marine vessel, and a flying object, for example.

In this embodiment, the content of provided information may be decided according to a period of time elapsed from the end of the latest or most recent use. For example, the longer the elapsed period of time becomes, the guidance of the more conspicuous content may be performed, or during the time in which the elapsed period of time is short, only a service name, a logo or the like may be displayed, and when the elapsed period of time becomes long, an advertisement for promoting the use of the moving object may be displayed more actively. In this manner, the use of the moving object can be promoted more strongly, according to the elapsed period of time, i.e., a duration in which the moving object is not used.

The provided information in this embodiment may include information on a fee for the use of the moving object. The information on the use fee may be an amount of money of the fee itself, or may be a discount rate or a discount amount from a normal fee, or may be a notification that there is a discount application. For example, the use fee may be decided in such a manner that the lower the probability of the moving object being used is estimated to be, the lower the use fee thereof becomes. For example, the use fee may be decided according to the period of time elapsed from the end of the latest use of the moving object, and in this case, it may be that the longer the elapsed period of time, the lower the use fee be set. In addition, the use fee may also be decided according to the location of the moving object, and in this case, it may be that the smaller the record of the frequency of use of the moving object at the location, the lower the use fee be set. Moreover, the use fee may also be decided according to the number of other moving objects which exist in the surroundings of the moving object, or the number of potential users who exist in the surroundings of the moving object. In these cases, it may be that the more the number of the moving objects, or the smaller the number of the potential users, the lower the use fee be set. Thus, by deciding the use fee in such a manner, it becomes possible to promote the use of the moving object more actively.

In addition, the provided information in this embodiment may include a destination of movement and a monetary merit or benefit to be received by the user in cases where the moving object has been moved to the destination of movement. The destination of movement may be a location in which the demand for using moving objects is high, but the number of moving objects is small. Moreover, the monetary merit may be a discount of the use fee, or may be a reward for the movement. Thus, by specifying the destination of movement and giving the monetary merit, deadheading of the moving object, which should normally be carried out by a service provider, can be carried out by the user.

First Embodiment (System Outline)

Figure 1:
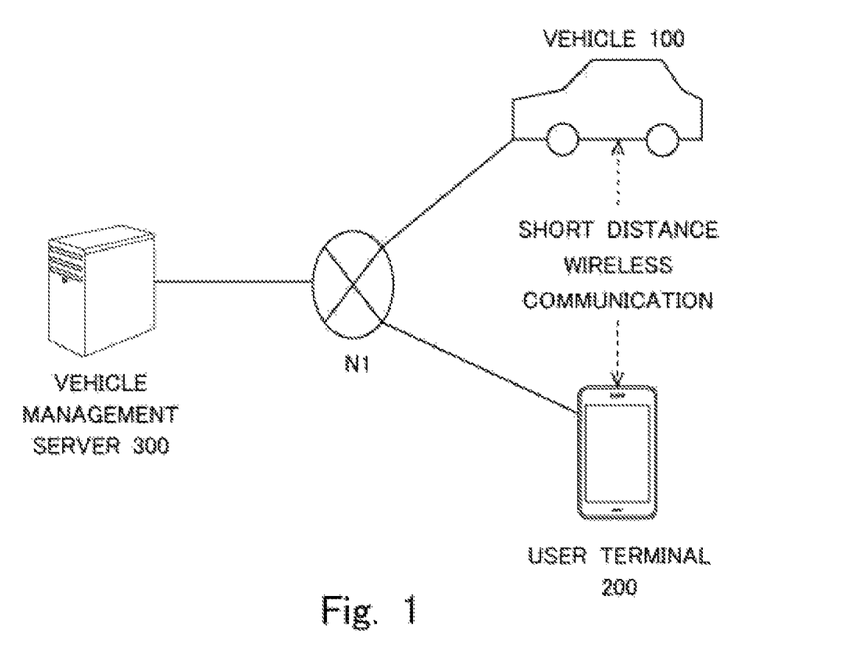
FIG. 1 is a schematic view of a car sharing system according to one embodiment of the present disclosure.

FIG. 1 is a view illustrating the schematic construction of a car sharing system 1 (hereinafter, referred to as a system 1) according to this embodiment. In an example of FIG. 1, the system 1 includes a vehicle 100, a user terminal 200 possessed by a using person (user), and a vehicle management server 300. An on-board device of the vehicle 100 (hereinafter, also referred to simply as the vehicle 100), the user terminal 200 and the vehicle management server 300 are mutually connected to one another by means of a network N1. In FIG. 1, the vehicle 100 and the user terminal 200 are illustrated, one for each of them, but there may be a plurality of vehicles and user terminals, respectfully.

The user reserves the vehicle 100 by accessing the vehicle management server 300 with the use of the user terminal 200, and uses the vehicle 100 by unlocking it through proximity communication between the user terminal 200 and the vehicle 100.

The vehicle management server 300 receives a reservation from the user terminal 200. In addition, the vehicle management server 300 communicates with the vehicle 100, thereby notifying a status of reservation to the vehicle 100, and obtaining the state of the vehicle 100. The vehicle management server 300 may also decide the content of information to be provided by the vehicle 100, and may notify it to the vehicle 100.

The vehicle 100 performs locking and unlocking through short distance communication with the user terminal 200. In addition, the vehicle 100 transmits to the vehicle management server 300 information that the use of the vehicle 100 has been started/ended, or information that the vehicle 100 is being used/not being used, or information on the current location of the vehicle 100. The vehicle 100 has a display which can be visually recognized from the outside of the vehicle 100, as will be described later, and in cases where the vehicle 100 is not being used, information is provided (displayed) from the display.

(Device Configuration)

Figure 2:
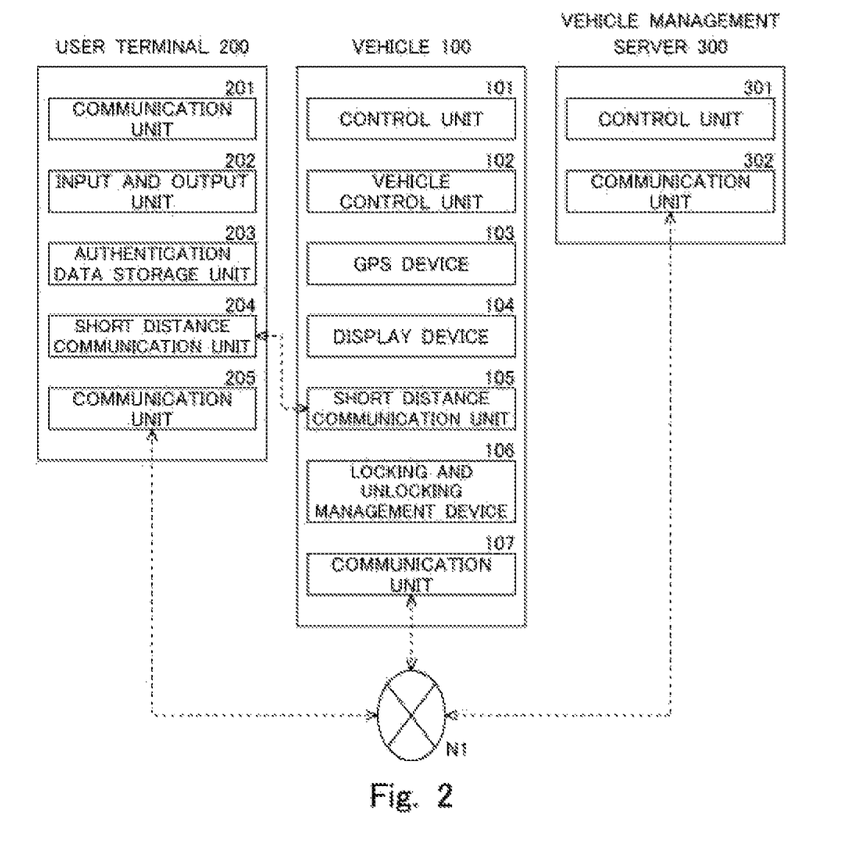
FIG. 2 is a block diagram illustrating the functional configuration of each device in the one embodiment.

FIG. 2 is a view illustrating the configurations of the vehicle 100, the user terminal 200, and the vehicle management server 300 in more detail.

The vehicle 100 is provided with a control unit 101, a vehicle control unit 102, a GPS device 103, a display device 104, a short distance communication unit 105, a locking and unlocking management device 106, and a communication unit 107. The control unit 101 is a computer (information processing device) that is composed of a processor, a main storage unit, an auxiliary storage unit, etc., and manages overall control with respect to a car sharing service of the vehicle 100. The vehicle control unit 102 is also a computer (information processing device) that is composed of a processor, a main storage unit, an auxiliary storage unit, etc., and manages vehicle control. The GPS device 103 obtains location information based on a satellite signal from a GPS communication satellite. The display device 104 is arranged in such a manner that it can be visually recognized from the outside of the vehicle 100. The display device 104 may be arranged in the interior of the vehicle 100, or may be arranged in the exterior of the vehicle. In addition, the exterior (outer wall) of the vehicle 100 itself may be constituted by the display device 104. The short distance communication unit 105 carries out short distance communication with the user terminal 200 (i.e., a short distance communication unit 204). Here, note that the short distance communication in this embodiment means a wireless communication system with a communication range of about 1 meter or less in general, but does not mean a specific communication system or method. Specifically, the short distance communication system includes wireless communications such as a near field wireless communication (NFC), Bluetooth (registered trademark), ZigBee, etc. The locking and unlocking management device 106 is a device that manages the locking and unlocking of doors of the vehicle 100, and the locking and unlocking of a glove box which stores a key of the vehicle. The communication unit 107 communicates with the user terminal 200 and the vehicle management server 300 through the network N1. A specific communication system or method of the communication unit 107 is not limited in particular.

The user terminal 200 is provided with a control unit 201, an input and output unit 202, an authentication data storage unit 203, the short distance communication unit 204, and a communication unit 205. The control unit 201 is a computer (information processing device) that is composed of a processor, a main storage unit, an auxiliary storage unit, etc., and manages the overall control of the user terminal 200. The input and output unit 202 is, for example, a touch screen, but is not be limited to this, and may be composed of existing arbitrary input and output devices. The authentication data storage unit 203 stores authentication data for identifying or authenticating the user of the user terminal 200. The authentication data is transmitted to the vehicle 100 through the short distance communication unit 204, so that the locking and unlocking of the vehicle 100 are carried out. The short distance communication unit 204 and the communication unit 205 are the same as the short distance communication unit 105 and the communication unit 107 with which the vehicle 100 is provided, so the explanation thereof will be omitted. The control unit 201 may also execute an application program for accessing the vehicle management server 300 and performing the search and reservation of the vehicle 100.

The vehicle management server 300 is provided with a control unit 301 and a communication unit 302. The control unit 301 is a computer (information processing device) that is composed of a processor, a main storage unit, an auxiliary storage unit, etc., and manages the overall control of the vehicle management server 300. The vehicle management server 300 mainly provides a service for performing the search and reservation of the vehicle 100 to the user terminal 200. In addition, the vehicle management server 300 carries out processing such as the transmission of reservation information to the vehicle 100, the management of the use state and the location information of the vehicle 100, the decision and transmission of the use fee of the vehicle 100 and information to be provided.

The above-mentioned individual control units are each composed of a processor such as a CPU, a DSP or the like, a main storage unit such as a read-only memory (ROM), a random-access memory (RAM) or the like, and an auxiliary storage unit such as an EPROM, a hard disk drive (HDD), a removable medium or the like. Here, note that the removable medium is, for example, a flash memory such as a USB memory, an SD card or the like, or a disk recording medium such as a CD-ROM, a DVD disk, a Blu-ray Disc or the like. An operating system (OS), various kinds of programs, various kinds of tables, etc., are stored in the auxiliary storage unit. The processor executes a program stored in the auxiliary storage unit by loading it to a working area of the main storage unit. By controlling each component unit through the execution of the program, it is possible to achieve each functional unit which accomplishes a predetermined purpose, as will be described later. However, a part or all of the functional units may be achieved by a hardware circuit(s) such as an ASIC, an FPGA, or the like. However, each of the control units 101, 201, 301 need not necessarily be achieved by a single physical configuration, but may be composed of a plurality of computers which mutually cooperate with one another.

(Processing Flow During Use of the Vehicle)

Figure 3:
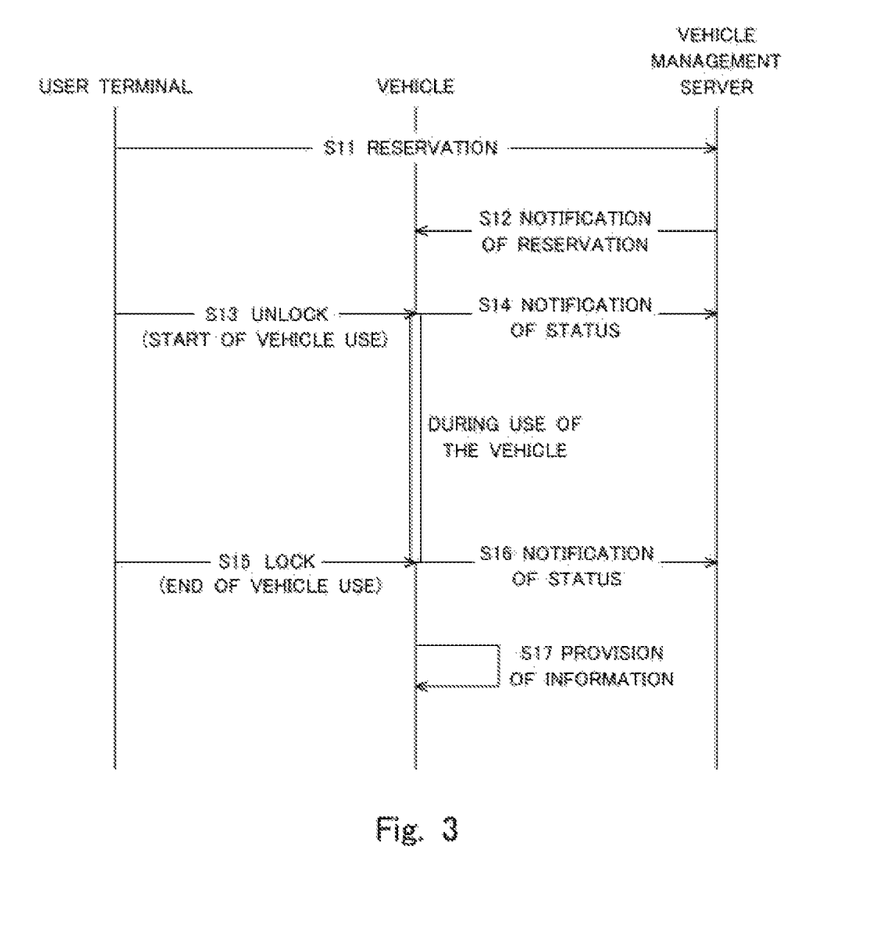
FIG. 3 is a view illustrating a flow of processing at the time when a user uses a vehicle in the one embodiment.

A flow of the processing at the time when the user uses the vehicle 100 will be explained with reference to FIG. 3.

In step S11, a user reserves the vehicle 100 by accessing the vehicle management server 300 through the user terminal 200. Here, note that reservation processing may be carried out by using a dedicated app for use with the car sharing service installed in the user terminal 200, or may be carried out by accessing a website which is provided by the vehicle management server 300. The vehicle management server 300 can also provide an available vehicle search function, and the user can make a reservation by specifying a vehicle thus searched. In addition, the user terminal 200 may perform short distance communication with the vehicle 100 so as to identify the vehicle 100, and may specify and reserve the vehicle 100 thus identified.

In step S12, by communicating with the vehicle 100, the vehicle management server 300 notifies that the vehicle 100 has been reserved.

In step S13, the user performs short distance communication by bringing the user terminal 200 close to the vehicle 100. The short distance communication unit 204 of the user terminal 200 transmits authentication data stored in the authentication data storage unit 203 to the short distance communication unit 105 of the vehicle 100. The vehicle 100 authenticates whether the received authentication data belongs to a subscriber (reservation person), and if the authentication is succeeded, the vehicle 100 is unlocked by the locking and unlocking management device 106. With this, the user becomes able to get in the vehicle 100, and the operation of the vehicle 100 can be started by using a vehicle key stored in the glove box of the vehicle 100.

In step S14, the control unit 101 of the vehicle 100 notifies the vehicle management server 300 through the communication unit 107 that the vehicle 100 has been used. With this, the vehicle management server 300 can grasp that the use of the vehicle 100 has been started.

When returning the vehicle, in step S15, the user returns the key of the vehicle 100 to the glove box, and then locks the vehicle 100, by bringing the user terminal 200 close to the vehicle 100 and performing short distance communication between them. Specifically, if the authentication of the user is succeeded, the control unit 101 of the vehicle 100 locks the vehicle 100 by means of the locking and unlocking management device 106.

In step S16, the control unit 101 of the vehicle 100 notifies the vehicle management server 300 through the communication unit 107 that the use of the vehicle 100 has been ended. With this, the vehicle management server 300 can grasp that the use of the vehicle 100 has been ended.

In step S17, the control unit 101 of the vehicle 100 can grasp that the use of the vehicle 100 has been ended, so it performs information providing processing of the information on the vehicle 100 using the display device 104. The details of the information providing processing will be described later.

Here, note that the vehicle 100 transmits location information to the vehicle management server 300 through the communication unit 107 in a periodic manner, so that the vehicle management server 300 can grasp the location of the vehicle 100.

(Information Providing Processing)

Figure 4:
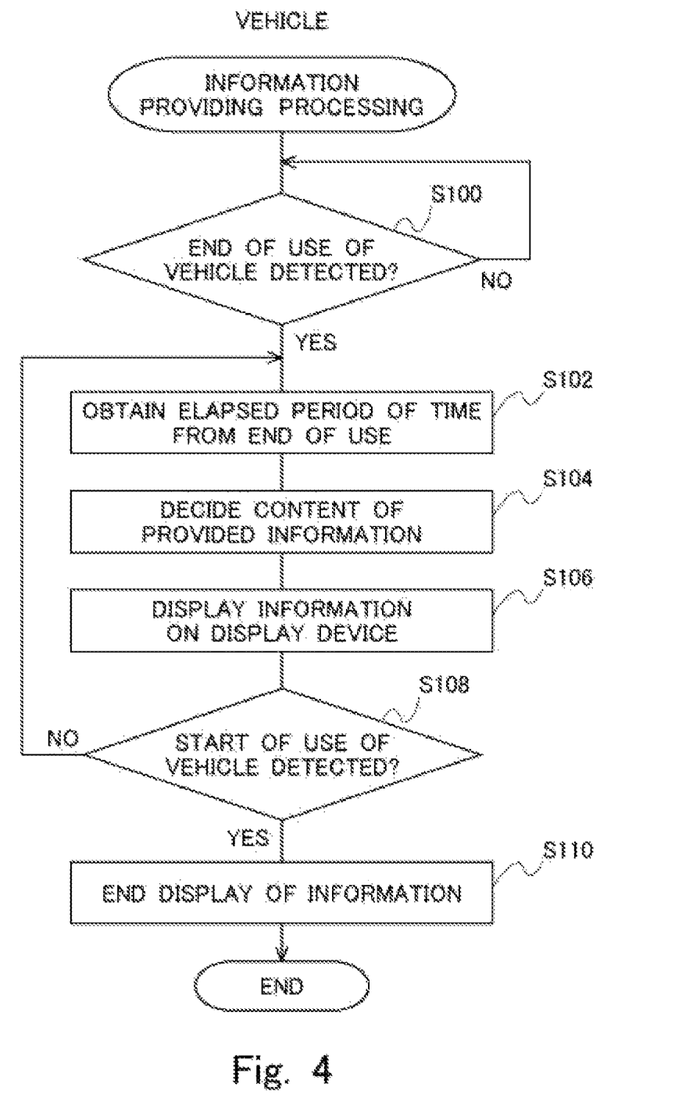
FIG. 4 is a flow chart illustrating information providing processing in the one embodiment.

Next, the information providing processing in the vehicle 100 will be explained with reference to FIG. 4.

In step S100, the control unit 101 of the vehicle 100 determines whether the use of the vehicle 100 by the user has been ended, and when the end of the use is detected or determined (YES in step S100), the processing (routine) advances to step S102. As mentioned above, in this embodiment, the end of the use of the vehicle 100 is determined based on the fact that the vehicle 100 has been locked through the short distance communication using the user terminal 200. The control unit 101 stores a time point at which the use of the vehicle 100 was ended.

In step S102, the control unit 101 obtains the elapsed period of time from the end of the latest use of the vehicle 100. This elapsed period of time can be obtained as a difference between a current time point and a time point of the end of the use.

In step S104, the control unit 101 decides the content of provided information according to the elapsed period of time from the end of the latest use. As an example, it is considered that the provided information is switched or changed according to the elapsed period of time, in such a manner that at first, only a service name, a logo or the like is displayed, then, an indication that the vehicle 100 is available is displayed, and with a further lapse of time, an indication including detailed information such as a use fee is displayed. What kind of provided information is adopted according to the elapsed period of time should just be defined in advance. Here, note that the same information may always be displayed, without changing the provided information according to the elapsed period of time from the end of the use, e.g., information including an indication that the vehicle 100 is available and a use fee may always be displayed. A decision on the provided information may be made by the vehicle 100, or may be made by the vehicle management server 300, or may be made by other devices. In cases where the decision on the provided information is made by the vehicle management server 300 or the other devices, the control unit 101 may access the vehicle management server 300 or the other devices, request a decision on the provided information, and obtain the information thus decided.

Figure 5:
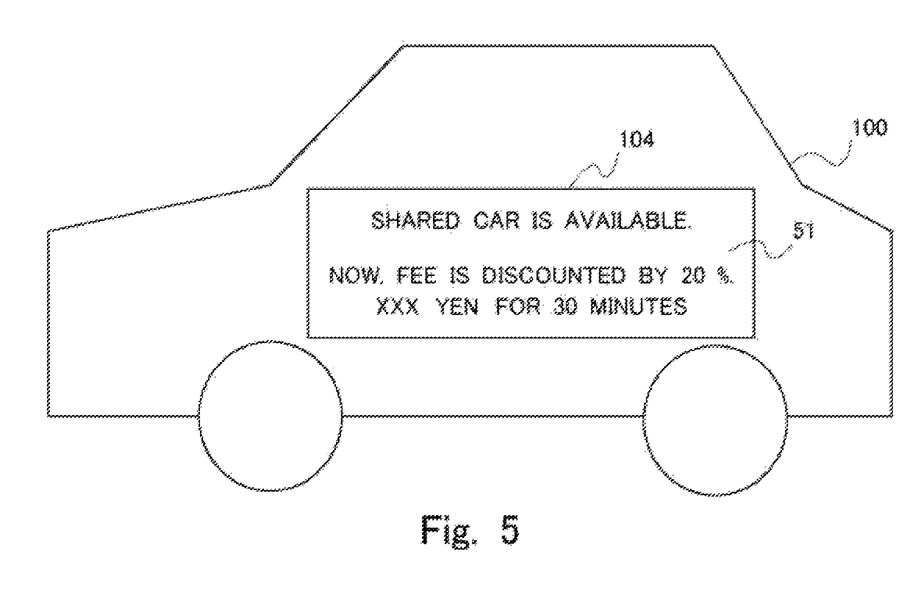
FIG. 5 is a view illustrating an example of information to be presented in the one embodiment.

In step S106, the control unit 101 displays the provided information decided in step S104 on the display device 104. FIG. 5 illustrates the provided information 51 to be displayed on the display device 104. Here, note that the provided information illustrated in FIG. 5 is only an example, and as mentioned above, it is not limited in particular as long as its content indicating that the vehicle 100 is available as a shared car is conveyed or informed to the user.

In step S108, the control unit 101 determines whether the use of the vehicle 100 has been started by the user. Here, note that the start of the use of the vehicle 100 may be set to a timing at which the vehicle 100 is unlocked through proximity communication between the user terminal 200 and the vehicle 100 (step S13 in FIG. 3), or may be set to a timing at which the vehicle 100 is reserved (steps S11-S12 in FIG. 3). While the vehicle 100 is not used, the processings from step S102 to step S106 are repeated. When the start of the use of the vehicle 100 is detected, the routine goes to step S110. In step S110, the control unit 101 ends the display of the information on the display device 104.

(Use Fee Decision Processing)

Here, explanation is made on how the use fee is decided in a specific embodiment in which the use fee of the vehicle 100 is included in the provided information, and in which the use fee is decided in a dynamic manner. Here, note that the decision processing of the use fee may be carried out in the vehicle management server 300 (the control unit 301), or may be carried out by the vehicle 100 (the control unit 101), or may be carried out by other devices.

A first determination method for the use fee is a method of deciding the use fee according to the elapsed period of time from the end of the latest use of the vehicle 100. In this case, the use fee is decided to be lower according to the length of the elapsed period of time from the end of use. Here, note that the use fee need not be changed continuously with respect to the elapsed period of time, but may be changed discontinuously. In addition, the use fee need not be changed linearly with respect to the elapsed period of time, but may be changed nonlinearly. These are also applied in cases where the use fee is decided according to other elements than the elapsed period of time.

A second determination method for the use fee is a method of deciding the use fee according to a parking location of the vehicle 100. In this case, for example, the smaller the record of the frequency of past use of vehicles at the location, the lower the use fee is decided. The record of use (frequency) referred to herein may be one for the entire vehicles which are managed by the vehicle management server 300. In this case, as mentioned above, each vehicle 100 timely transmits status information thereof to the vehicle management server 300, so that the vehicle management server 300 can grasp when and where the use of each vehicle 100 was started.

A third determination method for the use fee is a method of deciding the use fee according to the number of other vehicles existing in the surroundings of the vehicle 100. In this case, the more the number of surrounding other vehicles, the lower the use fee is decided. Here, note that the other vehicles referred to herein are those which are managed by the vehicle management server 300, in other words, those vehicles which can be used as shared cars by the user. In addition, as mentioned above, the vehicle 100 timely transmits a use situation (condition) and location information to the vehicle management server 300, so the vehicle management server 300 can grasp where an available vehicle 100 is located.

A fourth determination method for the use fee is a method of deciding the use fee according to the number of potential users existing in the surroundings of the vehicle 100. In this case, the smaller the number of surrounding potential users, the lower the use fee is decided. Here, note that the potential users referred to herein indicate those who are capable of using the vehicle 100, and typically mean registered users of the car sharing service. How many potential users exist in which areas may be investigated in advance, and may be held as data in the vehicle management server 300, for example. Alternatively, the vehicle management server 300 may receive in real time location information from a user terminal 200 of a potential user, and may grasp the location thereof.

In any of the above-mentioned methods, the longer the period of time for which the vehicle 100 is not used, or the longer the period of time for which the vehicle 100 is not used is presumed to be, the lower the use fee is set. That is, in cases where the demand for the vehicle 100 is small, or in cases where the demand is predicted to be small, the use fee is made low. As a result of this, by more actively promoting the use of the vehicle 100 which has a low prospect of being used, it is possible to avoid unnecessary price reduction and at the same time to expect an improvement in the operation rate (or availability) of the vehicle.

The above methods can also be adopted in combination with one another. In that case, either (e.g., a maximum value or a minimum value) of the use fees obtained by a plurality of methods may be set as a final use fee, or a fee (e.g., a simple average (simple mean value), a weighted average (weighted mean value)) based on the use fees obtained by a plurality of methods may be set as a final use fee.

In addition, the content of the information to be displayed on the display device 104 may also include an amount of money of the use fee itself, or may also include a discount amount or a discount rate from a regular fee, or may also include a plurality of them. In an example of FIG. 5, a discount rate and an amount of money are displayed as the provided information.

(Incentive Presentation to Vehicle Movement (Transport))

It is considered that an indication to the effect that a monetary merit is provided to the user in cases where the user moves or transports the vehicle 100 to a specific place is included in the provided information (guidance) to be displayed by the vehicle 100. In a one-way car sharing service, a deviation in location of available vehicles may be caused, so deadheading of such vehicles is required in a periodic manner. In order to have such deadheading performed by the user itself, there is displayed a notice or message that a monetary merit is provided to the user when he or she moves or transports the vehicle 100 to a specific place. Here, the monetary merit may be a discount of the use fee, or may be a reward of money or points.

The vehicle management server 300 is configured in such a manner that how many available vehicles should exist in which locations, in other words, the minimum number of vehicles required at each location, has been stored in advance. The vehicle management server 300 decides that in cases where the number of vehicles in a certain location becomes less than the minimum value (number), a guidance (information) for promoting the movement (transport) of a vehicle to that location (hereinafter, also referred to as a destination of movement) is presented. Target vehicles to which such a guidance is presented may be all the vehicles managed by the vehicle management server 300, but may be limited to only those vehicles which are close to the destination of movement. In cases where the vehicle management server 300 receives a request for obtaining the content of the information (guidance) to be provided from the vehicle 100, and in cases where the vehicle 100 is within a predetermined distance from the destination of movement, the vehicle management server 300 decides the content of guidance to the effect that a monetary merit is given in cases where the vehicle 100 is moved or transported to the destination of movement, and transmits it to the vehicle 100. In this case, a determination method for giving the monetary merit to the user is not limited in particular, but the method (merit) may be fixed, or may be decided according to the distance of movement or other conditions.

Advantageous Effects of this Embodiment

According to this embodiment, in the one-way car sharing service, even if neither a logo nor a service name is included on the exterior (external appearance) of a vehicle, a user can easily grasp that the vehicle being parked is available as a shared car.

Other Embodiments

The above-mentioned embodiment is only an example, and the present disclosure can be implemented while being changed or modified suitably without departing from the spirit and scope of the disclosure.

The method of using a vehicle in the above embodiment is not limited to the example explained above. For example, even if a user does not reserve the vehicle 100, the vehicle 100 may also be made available to the user, by performing proximity communication between the user terminal 200 and the vehicle 100.

In addition, in the above-mentioned embodiment, the user terminal 200 and the vehicle 100 perform direct communication with each other, whereby the start and the end of the vehicle use are notified to the vehicle 100. However, the user terminal 200 and the vehicle 100 may indirectly communicate with each other, thereby notifying the start and the end of the vehicle use to the vehicle 100. For example, the user terminal 200 may make applications for starting and ending the vehicle use to the vehicle management server 300, so that the start and the end of the vehicle use can be notified to the vehicle 100 from the vehicle management server 300.

Moreover, in the above-mentioned embodiment, the doors of the vehicle 100 are unlocked through proximity communication between the user terminal 200 and the vehicle 100, whereby the user takes out a key in the dashboard (glove box), and starts the vehicle 100. However, instead of this, for example, when the user applies for the use of the vehicle 100 by accessing the vehicle management server 300 from the user terminal 200, an electronic key may be transmitted to the user terminal 200 from the vehicle management server 300 or a key management server, so that locking/unlocking and starting of the vehicle can be carried out with the use of this electronic key.

Here, note that the processings, units and devices explained in this disclosure can be implemented in various combinations thereof, as long as technical inconsistency does not occur.

Moreover, the processing(s) explained as carried out by a single device may be carried out by a plurality of devices. Alternatively, the processing(s) explained as carried out by different devices may be carried out by a single device. In a computer system, whether each function of the disclosure is achieved by what kind of hardware configuration (server configuration) can be changed in a flexible manner.

The present disclosure can also be achieved by supplying a computer program which implements the functions explained in the above-mentioned embodiment to a computer, and by reading out and executing the program by means of one or more processors of the computer. Such a computer program may be supplied to the computer by a non-transitory computer readable storage medium which can be connected with a system bus of the computer, or may be supplied to the computer through a network. The non-transitory computer readable storage medium includes, for example, an arbitrary type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, an arbitrary type of medium suitable for storing electronic commands.

What is claimed is:

1. A system comprising:
    a user device associated with a user, the user device being configured to:
        send a reservation of use of a vehicle; and
        transmit authentication data to the vehicle through short distance communication to cause locking and unlocking of the vehicle;
    a server configured to:
        receive the reservation from the user device; and
        send a notification of the reservation to the vehicle; and
    an information providing device for providing information about the vehicle, the information providing device being an on-board device of the vehicle, the information providing device including a controller comprising at least one processor configured to execute:
        receiving the notification of the reservation from the server;
        receiving the authentication data from the user device;
        unlocking and initiating use of the vehicle by the user when the notification of the reservation and the authentication data are received;
        locking and ending use of the vehicle by the user in response to transmission of the authentication data from the user device;
        after an ending of use of the vehicle by another user, displaying first information indicating that the vehicle is available for use on a display provided by the vehicle and which can be visually recognized from outside of the vehicle, when the vehicle is not being used and the notification of the reservation and the authentication data have not been received;
        continuing the displaying of the first information on the display, when the vehicle is not being used and the notification of the reservation has been received, and the authentication data ha.s not been received; and
        stopping the displaying of information on the display of the vehicle by not providing the information from the controller to the display when the vehicle is being used and the notification of the reservation and the authentication data have been received.

2. The system of claim 1, wherein
the displayed first information includes information on a fee for use of the vehicle.

3. The of claim 2, wherein
the fee is decided according to a location of the vehicle.

4. The system of claim 2, wherein
the fee is decided according to a number of other vehicles existing in surroundings of the vehicle.

5. The system of claim 2, wherein
the fee is decided according to a number of potential users existing in surroundings of the vehicle.

6. The system of claim 1, wherein
the first information includes a destination of movement and an indication that the user can receive a monetary merit in cases where the vehicle has been moved to the destination of movement.

7. The system of claim 1, further comprising:
the vehicle.

* * * * *

UNITED STATES PATENT AND TRADEMARK OFFICE
CERTIFICATE OF CORRECTION

| | | |
|---|---|---|
| PATENT NO. | : 11,900,425 B2 | Page 1 of 1 |
| APPLICATION NO. | : 16/575708 | |
| DATED | : February 13, 2024 | |
| INVENTOR(S) | : Hiroyasu Hadano et al. | |

It is certified that error appears in the above-identified patent and that said Letters Patent is hereby corrected as shown below:

In the Claims

Claim 1, Column 12, Line 17, please change "ha.s" to --has--.

Signed and Sealed this
Thirtieth Day of April, 2024

*Katherine Kelly Vidal*

Katherine Kelly Vidal
*Director of the United States Patent and Trademark Office*